United States Patent [19]

Bourdeau et al.

[11] Patent Number: 4,934,669

[45] Date of Patent: Jun. 19, 1990

[54] HYDRAULIC SHOCK ABSORBER

[75] Inventors: Joël Bourdeau, Saint Jorioz; Jean-Michel Bouque, Cran Gevrier, both of France

[73] Assignee: Salomon S.A., Annecy Cedex, France

[21] Appl. No.: 376,587

[22] Filed: Jul. 7, 1989

[30] Foreign Application Priority Data

Jul. 8, 1988 [FR] France ................ 88 09333

[51] Int. Cl.$^5$ ............................................ F16F 13/00
[52] U.S. Cl. ................. 267/122; 188/322.21; 267/140.1; 280/11.14
[58] Field of Search ............ 188/322.15, 322.21; 267/118, 121, 122, 124, 126, 136, 140.1 A, 140.1 R; 280/11.14

[56] References Cited

U.S. PATENT DOCUMENTS

| 3,484,090 | 12/1969 | Mahoney | 267/121 X |
| 3,774,895 | 11/1973 | Willich et al. | 267/136 |
| 3,797,818 | 3/1974 | Willich et al. | 267/122 |
| 4,342,884 | 8/1982 | Ban et al. | 267/114 X |

FOREIGN PATENT DOCUMENTS

| 2305725 | 8/1973 | Fed. Rep. of Germany . |
| 1514729 | 2/1968 | France . |
| 56-101439 | 8/1981 | Japan . |

Primary Examiner—Duane A. Reger
Attorney, Agent, or Firm—Sandler, Greenblum & Bernstein

[57] ABSTRACT

A hydraulic shock absorber including an elongated body, closed at first and second opposite ends thereof, the elongated body containing a quantity of liquid. A piston is mounted for axial movement within the body and has longitudinally extending holes therein causing communication between first and second opposite chambers defined, respectively, in the body between the piston and the first and second ends of the body. The piston is able to be activated, in one direction, by a thrust rod extending axially within the first chamber of the body and is pushed, in the other direction, by a compression spring lodged in the second chamber of the body. The shock absorber further includes an internal coaxial bushing affixed to the second end of the body, extending over one part of the length of the body, in the direction of the first end of the body, and in which the piston is lodged freely sliding, the second chamber being defined in the bushing between the piston and the second end of the body. A deformable tubular membrane is further provided which includes a first part engaged with the bushing, so as to be tightly held between the bushing and the body, and a second part extending freely beyond the internal end of the bushing, in the direction of the first end of the body. Further, a thrust rod freely rests, by a first end, against the central part of the piston, which extends axially, from the piston, in the direction of the first end of the body and to the second end to which the end of the second part of the deformable tubular membrane is affixed which defines, jointly with the bushing, the thrust rod and the piston, the first chamber of the body, and means for guidance of the second end of the thrust rod within the body.

12 Claims, 2 Drawing Sheets

HYDRAULIC SHOCK ABSORBER

BACKGROUND OF THE INVENTION

1. Field of the Invention

The present invention relates to a hydraulic shock absorber of the piston type drilled with axially extending holes in a body, usable more particularly but not exclusively, in a form having relatively small dimensions, in devices mounted on a ski, such as safety bindings and brakes.

2. Discussion of Background and Other Information

As is well known, hydraulic shock absorbers generally comprise a piston slidably mounted axially within an elongated body, which is cylindrical or prismatic, with the piston being solidly affixed to a rod projecting outside of the body of the shock absorber. The piston rod and the body of the shock absorber are respectively connected to two elements which are movable with respect to one another which relative movement must be absorbed. To obtain such an absorption effect the piston defines, within the body, two opposite chambers filled with shock absorber liquid. The two chambers are in communication by means of longitudinal holes. In addition, means are provided to brake the flow of shock absorber liquid during its passage through the piston.

Shock absorbers of this type are of a relatively complex construction and do not lend themselves well to an embodiment having relatively small dimensions such as would be usable, for example, in connection with a ski binding.

SUMMARY OF THE INVENTION

Accordingly, it is an object of the present invention to provide a hydraulic shock absorber including an elongated body, closed at first and second opposite ends thereof, the elongated body containing a quantity of liquid. A piston is mounted for axial movement within the body and has longitudinally extending holes therein causing communication between first and second opposite chambers defined, respectively, in the body between the piston and the first and second ends of the body. The piston is able to be activated, in one direction, by a thrust rod extending axially within the first chamber of the body and is pushed, in the other direction, by a compression spring lodged in the second chamber of the body. The shock absorber further includes an internal coaxial bushing affixed to the second end of the body, extending over one part of the length of the body, in the direction of the first end of the body, and in which the piston is lodged freely sliding, the second chamber being defined in the bushing between the piston and the second end of the body. A deformable tubular membrane is further provided which includes a first part engaged with the bushing, so as to be tightly held between the bushing and the body, and a second part extending freely beyond the internal end of the bushing, in the direction of the first end of the body. Further, a thrust rod freely rests, by a first end, against the central part of the piston, which extends axially, from the piston, in the direction of the first end of the body and to the second end to which the end of the second part of the deformable tubular membrane is affixed which defines, jointly with the bushing, the thrust rod and the piston, the first chamber of the body, and means for guidance of the second end of the thrust rod within the body.

In one aspect of the invention, the deformable membrane includes a first part of relatively large diameter and length which is engaged on the bushing, a second part of relatively small diameter and length, and a third truncated intermediate connection part, the first part of relatively large diameter of the membrane being tightly held between the internal bushing and part of the body, and the second part, of relatively small diameter, of the deformable membrane, is affixed to the second end of the axially extending thrust rod.

According to an additional aspect of the invention, the second part of relatively small diameter of the membrane has, at its end, an internal collar engaged in an annular transverse groove provided in the lateral surface of the second end of the thrust rod.

According to a further aspect of the invention, the second end of the thrust rod includes an axial conduit which opens into the frontal surface of the thrust rod and which communicates, at its internal end, with at least one radial conduit opening into the lateral surface of the second end of the thrust rod, for filling of the shock absorber with liquid.

According to a still further aspect of the invention, the second end of the thrust rod is lodged in a guidance cap which includes a skirt whose external diameter is equal to or substantially equal to the internal diameter of a part of the body in which it is lodged, the guidance cap being pushed, in the relaxed position, against an internal collar of the body. Further, the guidance cap includes a transverse base having a central hole positioned facing the axial conduit.

According to a still further aspect of the invention, the piston includes a transverse base having a central hole having a given diameter and holes having a diameter less than the given diameter which are distributed around the axis of the piston, the internal end of the thrust rod rests against the base of the piston, sealing the central hole.

Still further, the holes of the base of the piston open, on the one hand, into the frontal surface of the piston, which faces the first end of the body, and, on the other hand, open into a diametrical groove which open into another frontal surface of the base on which one end of the compression spring rests.

Still further according to the invention, the base of the piston is extended by a peripheral skirt having an external diameter equal to or substantially equal to the internal diameter of the bushing, so as to ensure the axial guidance of the piston within the bushing.

According to a still further aspect of the invention, the compression spring rests, at its end opposite the piston, on a sealing valve lodged in the extreme part of bushing and which normally seals a central hole of the base of the bushing.

According to a still further aspect of the invention, the valve includes an annular collar which is pressed, under the action of the spring, by means of an annular flange, against the internal surface of the base of the bushing, and the valve likewise supports an axial lug engaged in the central hole of the base of the bushing.

In a particular object of the invention, the shock absorber is for use with a ski binding which includes a jaw for retaining an end of a ski boot and means for operatively connecting the jaw to the thrust rod of the shock absorber.

BRIEF DESCRIPTION OF THE DRAWINGS

An embodiment of the present invention is described below by way of non-limiting examples, with reference to the annexed drawings in which.

DETAILED DESCRIPTION OF THE PREFERRED EMBODIMENTS

The present invention overcomes the disadvantages of known shock absorbers providing a hydraulic shock absorber of particularly simple design, which has small dimensions but is easy to manufacture and, consequently, has a low cost.

To this end, the hydraulic shock absorber of the present invention has an elongated body, closed at its first and second opposite ends, containing a shock absorber liquid, and a axially movable piston mounted in the elongated body. This piston is drilled through with longitudinal holes to enable communication between the first and second opposite chambers defined, respectively, in the body between the piston and the first and second ends of the body. The piston is able to be activated, in one direction, by a thrust rod extending axially within the first chamber of the body while being pushed, in the other direction, by a compression spring lodged in the second chamber of the body.

According to the present invention, the shock absorber includes an internal coaxial bushing affixed to the second end of the body, extending over one part of the length of the body, in the direction of the first end of the body, and the piston is lodged freely sliding within the bushing. The second chamber is defined in the bushing between the piston and the second end of the body. Further, a deformable tubular membrane is provided which includes a first part threaded on the bushing, so as to be tightly held between the bushing and the body, and a second part extending freely beyond the internal end of the bushing, in the direction of the first end of the body. The shock absorber further includes a thrust rod which freely rests, by a first end, against the central part of the piston, which extends axially, from the piston, in the direction of the first end of the body. On the second end of the body the end of the second part of the deformable tubular membrane is affixed which thus defines, together with the bushing, the rod and the piston, the first chamber of the body, and the guidance means of the second end of the thrust rod within the body.

Figure 1:
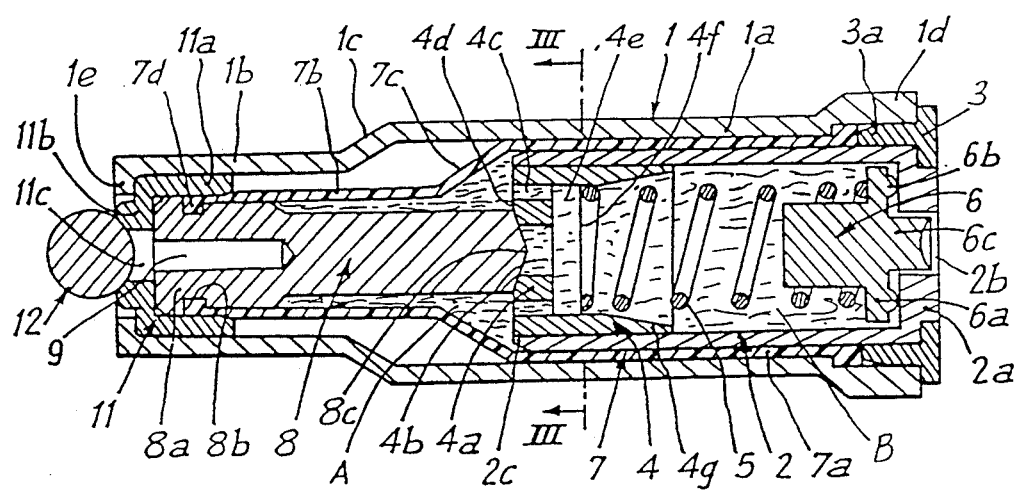
FIG. 1 is an axial sectional view of a hydraulic shock absorber according to the invention, in the relaxed position.
Figure 2:
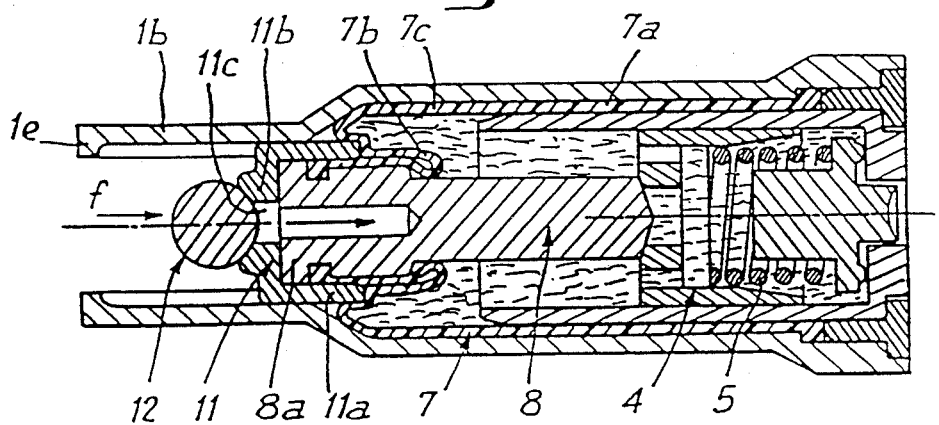
FIG. 2 is an axial sectional view of the hydraulic shock absorber in the compressed position.
Figure 3:
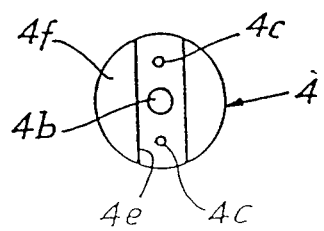
FIG. 3 is a transverse sectional view along the line III—III of FIG. 1.

The hydraulic shock absorber according to the invention, which is shown in FIGS. 1-3, includes an elongated body 1, of a cylindrical or prismatic shape, which is constituted by a right part 1a having a greater diameter and a greater length, by left part b having a smaller diameter and a smaller length, and by a truncated intermediate connection part 1c. Body 1 is open at its right and left ends 1d and 1e.

Within the right part 1a, of greater diameter, a coaxial bushing 2 is located having an external diameter less than the internal diameter of the part 1a of body 1. Bushing 2 is partially closed, at its right end, by a transverse base 2a drilled with a central hole 2b. The right end of the bushing 2 is affixed to the interior of the right end 1d of the body by means of an external intermediate ring 3 which seals, together with the base 2a of bushing 2, the right end 1d of the body 1 Ring 3 includes a peripheral skirt 3a which is tightly engaged between the external surface of the bushing 2 and the internal surface of the slightly enlarged end 1d, of the body 1. The bushing 2 extends along the greater part of the length of part 1a of body 1 and it is totally open at its left end 2c.

Within the bushing 2 a piston 4 freely axially slides and is acted upon by a compression spring 5. Piston 4 includes, in its left part, a transverse base 4a drilled through with longitudinal holes, i.e., a central hole 4b of greater diameter and holes 4c of very small diameter, which are distributed around the axis of the piston. The holes 4b, 4c open up, on the one hand, into the left frontal surface 4d of the piston 4, i.e., that which is turned towards the end 1e of body 1, and, on the other hand, into a diametrical internal groove 4e. This diametrical groove 4e opens in turn into the right frontal surface 4f of the base 4a on which the left end of the compression spring 5 rests. The base 4a of the piston 4 is extended towards the right by a peripheral skirt 4g having an external diameter equal to the internal diameter of the bushing 4, so as to ensure the axial guidance of the piston 3 within the bushing.

The compression spring 5 rests, at its end opposite the piston 4, on a sealing valve 6 located in the extreme right part of the bushing 2 and which normally seals the central hole 2b of the base 2a of bushing 2. This valve 6 includes an annular collar 6a which is pressed, under the action of spring 5, by means of an annular flange 6b, against the internal surface of the base 2a of bushing 2, and valve 6 likewise supports an axial lug 6c extending towards the exterior and is engaged in the central hole 2b of the base 2a of bushing 2.

The hydraulic shock absorber includes a deformable tubular membrane 7 with a variable cross-section, which has, in the rest position, i.e., when the shock absorber is relaxed, as in FIG. 1, a shape similar to that of body 1. Thus, it comprises a right part 7a of greater diameter and greater length which is threaded on the bushing 2, a left part of smaller diameter and shorter length 7b and a truncated intermediate connection part 7c. The right part 7a of the membrane 7 is tightly held between the internal bushing 2 and part 1a of body 1. Furthermore, the left part 7b of the deformable membrane 7 is affixed to the extreme left part 8a of an axially extending thrust rod 8. The smaller diameter part 7b of membrane 7 has, preferably, on its end, an internal collar 7d engaged in a transverse annular groove 8b provided in the lateral surface of extreme part 8a of rod 8. Furthermore, rod 8 rests freely, by its right end 8c, against the central part of the front left surface 4d of piston 4, thereby sealing the central hole 4b of piston 4. More particularly, end 8c preferably has a conical shape to engage in a hollow portion of the same shape provided in the central part of base 4a and in the central hole 4b.

Figure 4:
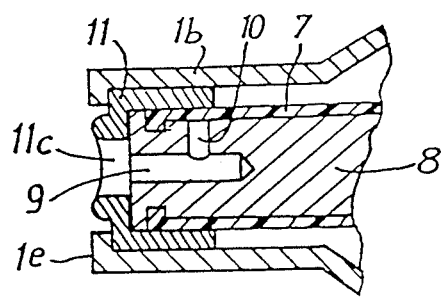
FIGS. 4 and 5 are partial axial sectional views, taken on the diametrical plane containing the filling orifice, in the normal position and in the filling position, respectively.
Figure 5:
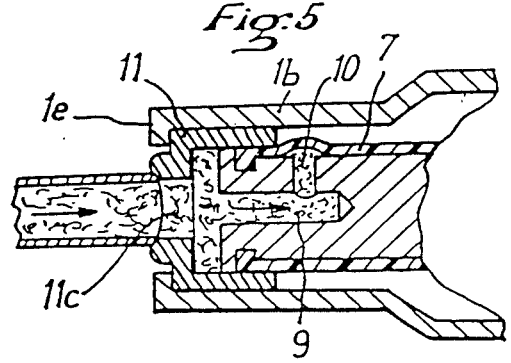

In the extreme left part 8a of the thrust rod 8 an axial conduit 9 is drilled and opens up into the left front surface of rod 8 and communicates, at its internal end, with at least one radial conduit 10, as shown in FIGS. 4 and 5, which opens into the lateral surface of extreme part 8a, for the filling of the shock absorber with liquid.

The extreme left part 8a of rod 8 is inserted in a guidance cap 11 which seals left end 1e of body 1. This cap includes a skirt 11a extending towards the right and whose external diameter is equal to the internal diameter of the smaller diameter 1b of body 1. This skirt extends beyond the internal collar 7d, which is provided at the end of the tubular membrane 7, and thus ensures the maintenance of the internal collar 7d in the groove 8b of rod 8. The skirt also extends beyond the radial conduit 10, when the shock absorber is in the normal position, as is shown in FIG. 4. Furthermore, the guidance cap 11 includes a transverse base 11b through which a central hole 11c is drilled to face axial conduit 9. In the relaxed position, shown in FIG. 1, the guidance cap 11 is pushed against an internal collar of body 1 provided at its left end 1e. The cap is adapted to be in contact with an activation element 12, shown in broken lines, which is adapted to push it towards the interior.

From the preceding description, it can be seen that piston 4 defines, within bushing 2 and membrane 7, two chambers A and B, filled with a liquid of appropriate viscosity, with the two chambers communicating by means of holes 4c drilled in the base 4a of the piston 4. The filling of the shock absorber is carried out by first pushing the rod 8 towards the interior, i.e., from the left towards the right in the drawing, to bring it in the position shown in FIG. 5. In this position the radial conduit 10 is offset axially to the exterior with respect to the edge of the skirt 11a of the guidance cap 11, so that the part of membrane 7 which is normally pressed on the external orifice of conduit 11 is then freed. The rod 8 is pushed towards the interior of the shock absorber, either under the effect of pressure of the liquid being exerted on the extreme left part 8a of rod 8 which forms a piston, or under the action of an appropriate tool axially engaged through the central hole 11c. Then the liquid is introduced through the left end of the shock absorber, that is, through hole 11c, the axial conduit 9 and the radial conduit 10. The liquid then penetrates within the tubular membrane 7, which swells, to fill the two chambers A and B.

During the filling operation, the sealing valve 6 is pushed towards the interior of body 1 by means of an appropriate tool engaged in the interior through the hole 2b, so as to permit the escape of air from within the shock absorber. When the liquid starts to go out of the shock absorber through hole 2b, valve 6 is allowed to close. As a result, it is ensured that no trace of air remains trapped within chambers A and B. The shock absorber liquid which totally fills the volume of the two chambers A and B is stopped simultaneously, without exerting pressure on the deformable membrane 7. At the end of the filling operation, rod 8 is released to then resume its normal position, shown in FIG. 4 in the cap 11 under the action of return spring 5. The radial conduit 11 reenters the skirt 11a of cap 11 and is then sealed by membrane 7 which is confined between rod 8 and skirt 11a.

According to an alternative embodiment, the filling of the shock absorber can be achieved in a different manner, that is, by omitting the axial conduit 9 and the radial conduit 10 provided for the introduction of the liquid within the membrane 7. In this case the valve 6 is replaced by a simple plug permanently in place in the shock absorber and which is made of a material which is easily perforated by a needle but then retains its imperviousness by itself, after withdrawal of the needle. It is then possible to fill the shock absorber by inserting the needle of a syringe filled with liquid through this plug and to force the liquid within the shock absorber until the internal volume defined by the membrane 7 is totally filled.

FIG. 2 illustrates the state of the shock absorber in the compressed position, i.e., after a force f has been exerted by the activation element 12 on the guidance cap 11, from the left towards the right. During the compression phase, the thrust rod 8 is pushed towards the right and it pushes before it piston 4 which slides towards the right within bushing 2 against the action of the compression spring 5. The spring is then compressed as shown in FIG. 2. During this displacement, the liquid passes from chamber B whose volume decreases, to chamber A whose volume increases, through small diameter holes 4c of the piston 4 causing a braking action proportional to the displacement velocity of the piston 4, i.e., of the rod 8. Furthermore, the free part of the membrane 7, i.e., that which is formed by parts 7b and 7c, deforms in the manner shown. More particularly, the intermediate part 7c is pushed towards the exterior to be in contact with the internal surface of greater diameter part 1a of body 1 and in the same manner with the smaller diameter part 7b of membrane 7 which is partially forced against the truncated intermediate part 1c of body 1. This part 7b becomes folded on itself in the shape of an S, following the displacement towards the right of the extreme part 8a of rod 8. As can be seen in FIG. 2, in the compressed position the volume of the left chamber A has been increased with respect to the relaxed state, whereas on the contrary, the volume of chamber B has been decreased. This occurs due to the passage of the liquid from chamber B to chamber A through the holes 4c. However, the sum of the volumes of chamber A and B remains constant.

When the force f is no longer applied, the tubular membrane 7, which is deformed as shown in FIG. 2, extends to resume its shape as shown in FIG. 1. This relaxation causes, because of the membrane's connection with the extreme left part 8a of rod 8, a sliding towards the left of the rod. This relaxation of the deformable tubular membrane 7 occurs faster than the return movement towards the left of the piston 4 under the action of the compression spring 5. As a result, the end 8c of rod 8 separates from the left front surface 4d of the piston 4, and thus opens the hole 4b provided in the central part of the piston. Consequently, because the central hole 4b has a passage section which is much greater than the total passage section through the holes 4c of small diameter, the return movement of piston 4 towards the left is practically carried out without braking because the shock absorber liquid passes freely from chamber A to chamber B through the central hole of greater diameter 4b.

It is noted that whatever the position of the movable elements of the hydraulic shock absorber, chamber A is never under pressure. It simply changes volume depending upon whether the shock absorber is relaxed or compressed. Because of this permanent absence of pressure in chamber A, membrane 7 can be of a very small thickness so that membrane 7 offers a weak resistance to the movement causing its deformation.

Figure 6:
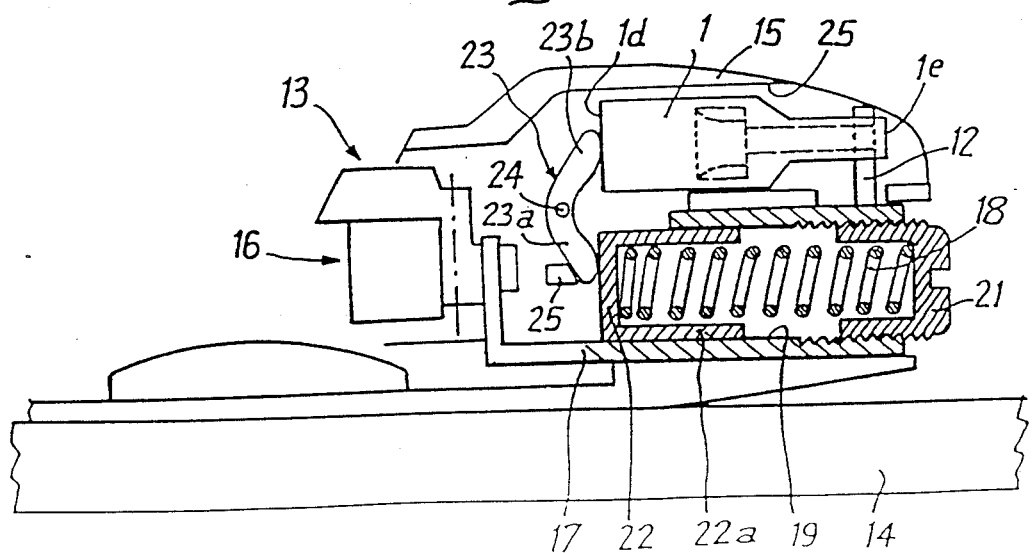
FIG. 6 is a vertical and longitudinal sectional view of a safety binding for a ski in which a shock absorber according to the invention is incorporated.

FIG. 6 illustrates the application of the hydraulic shock absorber according to the invention to a safety binding or front abutment 13 which is mounted on a ski 14 to maintain, thereon, the front of a ski boot (not shown). The front abutment 13 includes a fixed body 15 which supports at its rear part, a jaw 16 for retention of the boot. In this embodiment, the jaw 16 is constituted by two independent wings which are journalled on the body 15 for movement about axes perpendicular to the ski. The two wings act on a stay rod 17 which is mounted for longitudinal movement and is biased towards the front by an energization mechanism. This energization mechanism may be a compression spring 18 extending longitudinally in a longitudinal bore 19 which is provided on the anterior part of stay rod 17. The compression spring 18 rests, at its anterior end, on a plug 21 for adjustment of the stiffness of the binding, which is screwed into a threaded anterior part of bore 19. The spring 18 likewise rests, at its rear end, against a piston 22 which is slidably guided longitudinally in the bore 19 of stay rod 17, by means of a cylindrical skirt 22a which is an integral part of piston 22, and the base on which the spring 18 rests. The piston 22 is thus pushed towards the rear by compression spring 18 and it rests against the lower arm 23a of a rocker 23 which is journalled for movement about a horizontal and transverse axis 24. The lower arm 23a is immobilized towards the rear by a fixed stop 25 which is solidly affixed to the body 15. The rocker 23 includes an upper arm 23b, against which the end 1d of the 1 of the hydraulic shock absorber of the invention rests.

This hydraulic shock absorber is positioned longitudinally in a housing 25 which is formed in the upper part of body 15 above the bore 19 of the stay rod 17. Furthermore, the stay rod 17 is solidly affixed, at its anterior part, to the activation element 12 of the shock absorber, which is constituted, in this case, by a vertical rod extending towards the top. This rod 12 is engaged in the other end 1e of body 1 of the shock absorber and it rests on the internal cap 11 which is solidly affixed to thrust rod 8.

During skiing, the hydraulic shock absorber, according to the invention, has a different characteristic depending on the intensity of the bias exerted by the boot on the binding. During a relatively "gentle" bias, the shock absorber does not impose significant resistance and, consequently, it does not influence the compression of the spring 18 of the energization mechanism. On the contrary, during a relatively "violent" bias which is transmitted by the lateral retention wings 16 to the longitudinal stay rod 17, causes a sudden movement towards the rear and against the action of the compression spring 18. Simultaneously, the activation rod 12 of the shock absorber suddenly pushes the thrust rod 8 of this shock absorber towards the interior which "stiffens". As a result, the body 1 of the shock absorber pushes the upper arm 23b of the rocker 23 towards the rear which pivots in a counterclockwise direction around axis 24. This results in a displacement of piston 22 towards the front and an additional compression of spring 18. Thus, the phenomenon of blocking which occurs in the case where there is a parallel relationship between the shock absorber and the spring 18 of the energization mechanism, is avoided.

The fixed abutment 25 has the function of preventing the spring 18 from relaxing in the rest position by transferring its energy to the shock absorber.

Although the invention has been described with reference to particular means, materials and embodiments, it is to be understood that the invention is not limited to the particulars disclosed and extends to all equivalents within the scope of the claims.

What is claimed is:

1. A hydraulic shock absorber comprising an elongated body, closed at first and second opposite ends thereof, said elongated body containing a quantity of liquid, and a piston mounted for axial movement within said body, said piston having longitudinally extending holes therein causing communication between first and second opposite chambers defined, respectively, in said body between said piston and said first and second ends of said body, said piston being able to be activated, in one direction, by a thrust rod extending axially within said first chamber of said body and being pushed, in the other direction, by a compression spring lodged in the second chamber of said body, said shock absorber further comprising an internal coaxial bushing affixed to said second end of said body, extending over one part of the length of said body, in the direction of said first end of said body, and in which said piston is lodged freely sliding, said second chamber being defined in said bushing between said piston and said second end of said body, a deformable tubular membrane comprising a first part engaged with said bushing, so as to be tightly held between said bushing and said body, and a second part extending freely beyond the internal end of said bushing, in the direction of said first end of said body, a thrust rod which freely rests, by a first end, against the central part of said piston, which extends axially, from said piston, in the direction of said first end of said body and to said second end to which the end of said second part of said deformable tubular membrane is affixed which defines, jointly with said bushing, said thrust rod and said piston, said first chamber of said body, and means for guidance of said second end of said thrust rod within said body.

2. A hydraulic shock absorber according to claim 1 wherein said deformable membrane comprises a first part of relatively large diameter and length which is engaged on said bushing, a second part of relatively small diameter and length, and a third truncated intermediate connection part, said first part of relatively large diameter, of said membrane being tightly held between the internal bushing and part of said body, and wherein said second part, of relatively small diameter, of said deformable membrane is affixed to said second end of said thrust rod extending axially.

3. A hydraulic shock absorber according to claim 2 wherein said second part of relatively small diameter of said membrane has, at its end, an internal collar engaged in an annular transverse groove provided in the lateral surface of said second end of said thrust rod.

4. A hydraulic shock absorber according to claim 2 wherein said second end of said thrust rod comprises an axial conduit which opens into the frontal surface of said thrust rod and which communicates, at its internal end, with at least one radial conduit opening into the lateral surface of said second end of said thrust rod, for filling of said shock absorber with liquid.

5. A hydraulic shock absorber according to claim 2, wherein said second end of said thrust rod is lodged in a guidance cap which comprises a skirt whose external diameter is equal to or substantially equal to the internal diameter of a part of said body in which it is lodged, said guidance cap being pushed, in the relaxed position, against an internal collar of said body.

6. A hydraulic shock absorber according to claim 5 wherein said guidance cap comprises a transverse base having a central hole positioned facing said axial conduit.

7. A hydraulic shock absorber according to claim 1 wherein said piston comprises a transverse base having a central hole having a given diameter and holes having a diameter less than said given diameter which are distributed around the axis of said piston, the internal end of said thrust rod which rests against said base of said piston, sealing said central hole.

8. A hydraulic shock absorber according to claim 7 wherein said holes of said base of said piston open, on the one hand, into the frontal surface of said piston, which faces the first end of said body, and, on the other hand, open into a diametrical groove which open into another frontal surface of said base on which one end of said compression spring rests.

9. A hydraulic shock absorber according to claim 7 wherein said base of said piston is extended by a peripheral skirt having an external diameter equal to or substantially equal to the internal diameter of said bushing, so as to ensure the axial guidance of said piston within said bushing.

10. A hydraulic shock absorber according to claim 1 wherein said compression spring rests, at its end opposite said piston, on a sealing valve lodged in the extreme part of bushing and which normally seals a central hole of said base of said bushing.

11. A hydraulic shock absorber according to claim 10 wherein said valve comprises an annular collar which is pressed, under the action of said spring, by means of an annular flange, against the internal surface of said base of said bushing, and said valve likewise supports an axial lug engaged in said central hole of said base of said bushing.

12. A ski binding including the hydraulic shock absorber according to claim 1, which comprises a jaw for retaining an end of a ski boot and means for operatively connecting said jaw to said thrust rod.

* * * * *

UNITED STATES PATENT AND TRADEMARK OFFICE
CERTIFICATE OF CORRECTION

PATENT NO. : 4,934,669

DATED : June 19, 1990

INVENTOR(S) : Joel Bourdeau et al

It is certified that error appears in the above-identified patent and that said Letters Patent is hereby corrected as shown below:

```
At column 3, line 32, change "a" to ---an-0--.
At column 3, line 67, change "b" to ---1b---.
At column 4, line 9, after "body" insert ---1---.
At column 4, line 11, after "1" insert ---.---.
At column 4, line 17, after "2" insert ---,---.
At column 4, line 32, change "4" to ---2---.
At column 4, line 33, change "3" to ---4---.
At column 4, line 33, after "bushing" insert ---2---.
At column 4, line 51, after "length" delete "7b".
At column 4, line 67, after "8" insert ---3----.
At column 5, line 31, before "the" insert ---,---.
At column 5, line 35, change "11" to ---10---.
At column 5, line 40, after "Then" insert ---,---.
At column 5, line 58, after "4" insert ---,---.
At column 5, line 60, change "11" to ---10--- before "reenters".
At column 5, line 67, after "case" insert ---,---.
At column 7, line 28, before "1" insert ---body---.
Claim 10, line 4, before "bushing" insert ---said---.
```

Signed and Sealed this

Seventh Day of July, 1992

*Attest:*

DOUGLAS B. COMER

*Attesting Officer*     *Acting Commissioner of Patents and Trademarks*